(12) United States Patent
Gaboury et al.

(10) Patent No.: US 8,476,879 B2
(45) Date of Patent: Jul. 2, 2013

(54) SAVING ENERGY MODE (SEM) FOR AN INTERLEAVED POWER FACTOR CORRECTION (PFC) CONVERTER

(75) Inventors: Michael J. Gaboury, Burnsville, MN (US); Gregory J. Rausch, Minnetonka, MN (US); Shohei Osaka, Saitama (JP)

(73) Assignee: Polar Semiconductor, Inc., Bloomington, MN (US)

( * ) Notice: Subject to any disclaimer, the term of this patent is extended or adjusted under 35 U.S.C. 154(b) by 604 days.

(21) Appl. No.: 12/657,746

(22) Filed: Jan. 27, 2010

(65) Prior Publication Data

US 2011/0110134 A1    May 12, 2011

Related U.S. Application Data

(60) Provisional application No. 61/260,791, filed on Nov. 12, 2009.

(51) Int. Cl.
 *G05F 1/70* (2006.01)
(52) U.S. Cl.
 USPC ............................ 323/272; 323/207; 323/222
(58) Field of Classification Search
 USPC .................... 323/272, 271, 207, 222; 363/65, 363/71, 72
 See application file for complete search history.

(56) References Cited

U.S. PATENT DOCUMENTS

| | | | |
|---|---|---|---|
| 5,847,548 A | 12/1998 | He et al. | |
| 5,861,734 A | 1/1999 | Fasullo et al. | |
| 5,905,369 A | 5/1999 | Ishii et al. | |
| 6,091,233 A | 7/2000 | Hwang et al. | |
| 6,222,746 B1 | 4/2001 | Kim | |
| 6,448,745 B1 | 9/2002 | Killat | |
| 6,690,589 B2 | 2/2004 | Barnett et al. | |
| 7,019,502 B2 | 3/2006 | Walters et al. | |
| 7,626,372 B2* | 12/2009 | Yang | 323/285 |
| 8,098,505 B1* | 1/2012 | Choi | 363/89 |
| 2002/0135338 A1* | 9/2002 | Hobrecht et al. | 323/272 |
| 2007/0013350 A1* | 1/2007 | Tang et al. | 323/237 |
| 2007/0253223 A1 | 11/2007 | Neidorff et al. | |
| 2007/0253224 A1 | 11/2007 | Cohen et al. | |
| 2007/0262756 A1 | 11/2007 | Valley et al. | |
| 2007/0262823 A1 | 11/2007 | Cohen et al. | |
| 2008/0001590 A1* | 1/2008 | Yang et al. | 323/284 |
| 2008/0197817 A1 | 8/2008 | Colbeck et al. | |
| 2008/0316783 A1 | 12/2008 | O'Loughlin | |
| 2009/0290395 A1 | 11/2009 | Osaka | |
| 2009/0327786 A1* | 12/2009 | Carroll et al. | 713/340 |

\* cited by examiner

*Primary Examiner* — Harry Behm
(74) *Attorney, Agent, or Firm* — Kinney & Lange, P.A.

(57) ABSTRACT

A method of controlling a power factor correction (PFC) converter having a first PFC sub-circuit and a second PFC sub-circuit determines when to transition the PFC converter between an interleaved mode and a saving energy mode (SEM). The method includes generating an amplified error signal based on a monitored output voltage of the PFC converter. The second PFC sub-circuit is disabled in response to the amplified error signal being less than a first threshold value and enabled in response to the amplified error signal exceeding a second threshold value.

17 Claims, 6 Drawing Sheets

SAVING ENERGY MODE (SEM) FOR AN INTERLEAVED POWER FACTOR CORRECTION (PFC) CONVERTER

RELATED APPLICATIONS

This application claims priority to U.S. provisional patent application Ser. No. 61/260,791, filed on Nov. 12, 2009, titled "SAVING ENERGY MODE (SEM) FOR AN INTERLEAVED POWER FACTOR CORRECTION (PFC) CONVERTER"

This application is related to U.S. non-provisional patent application Ser. No. 12/617,662, filed on Nov. 12, 2009, titled "TIME LIMITING MODE (TLM) FOR AN INTERLEAVED POWER FACTOR CORRECTION (PFC) CONVERTER", by Michael Gaboury, Gregory Rausch, and Shohei Osaka and U.S. non-provisional patent application Ser. No. 12/617,664, filed on Nov. 12, 2009, titled "FREQUENCY COMPRESSION FOR AN INTERLEAVED POWER FACTOR CORRECTION (PFC) CONVERTER", by Michael Gaboury, Gregory Rausch, and Shohei Osaka.

BACKGROUND

The present invention relates to power factor correction (PFC) converters, and more particularly to interleaved PFC converters.

Electric power is distributed almost universally in an alternating current (AC) format that allows for efficient transmission. Most devices however, including personal computers, televisions, etc., require direct current (DC) power. Power supplies act to convert the AC input supplied by a line to a DC output suitable for consumption by a device or load. A switched-mode power supply (SMPS) employing a boost regulator is commonly employed in this role of AC-to-DC power conversion. A benefit of employing a SMPS having a boost regulator topology is the boost regulator can be controlled to provide power factor correction. Subsequent stages may be employed to step-down the output of the PFC boost regulator to a desired DC output voltage.

A boost regulator includes an inductor connected between a rectified input and the DC output. A shunt switch is selectively controlled to charge the inductor (during ON times of the switch) and to discharge the inductor to the DC output (during OFF times of the switch).

The power capability of an interleaved AC-to-DC converter may be increased by connecting PFC boost regulators in parallel with one another and switching them out-of-phase with one another in an interleaved manner to provide the desired output. Connecting the PFC boost regulators in parallel results in each boost circuit carrying half the current of a single boost regulator circuit. As a result, conductions losses—which are proportional to the square of the current through each parallel connected boost regulator—are cut in half as compared with a single boost regulator circuit. However, the addition of one or more parallel-connected PFC sub-circuits results in additional switching losses associated with having to turn ON and OFF one or more switches associated with each boost circuit. If the switching losses exceed the conduction losses, it may be beneficial to turn OFF one or more phases of the parallel connected PFC regulators. However, determining at what point it is desirable to turn ON or OFF a phase is difficult to determine at various operating points.

SUMMARY

The present invention provides a method of controlling a power factor correction circuit having a first PFC sub-circuit and a second PFC sub-circuit. The method includes generating an amplified error signal based on the monitored output voltage. The second PFC sub-circuit is disabled in response to the amplified error signal being less than a first threshold value. The second PFC sub-circuit is enabled in response to the amplified error signal exceeding a second threshold value.

DETAILED DESCRIPTION

Figure 1:
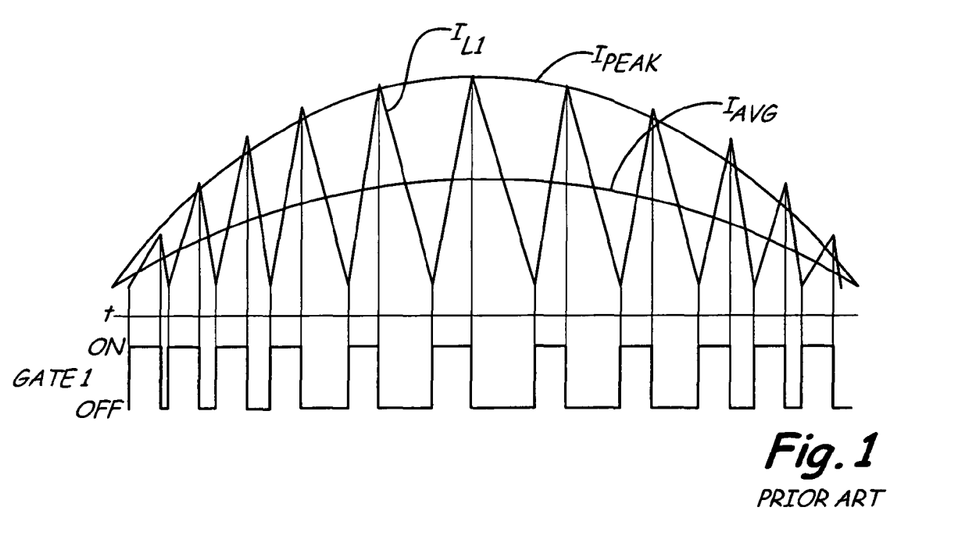
FIG. 1 is a waveform illustrating phase currents in a power factor correction (PFC) converter as known in the prior art.

FIG. 1 is waveform diagram associated with a power factor correction (PFC) converter. In general, a power factor correction converter includes an inductor, a diode, and a shunt switch that is controlled to selectively charge and discharge the inductor. The waveform shown in FIG. 1 illustrates the inductor current $I_{L1}$, average inductor current $I_{avg}$, peak inductor current $I_{peak}$ and gate drive signal GATE1 over a half-cycle of a rectified input voltage.

Figure 2:
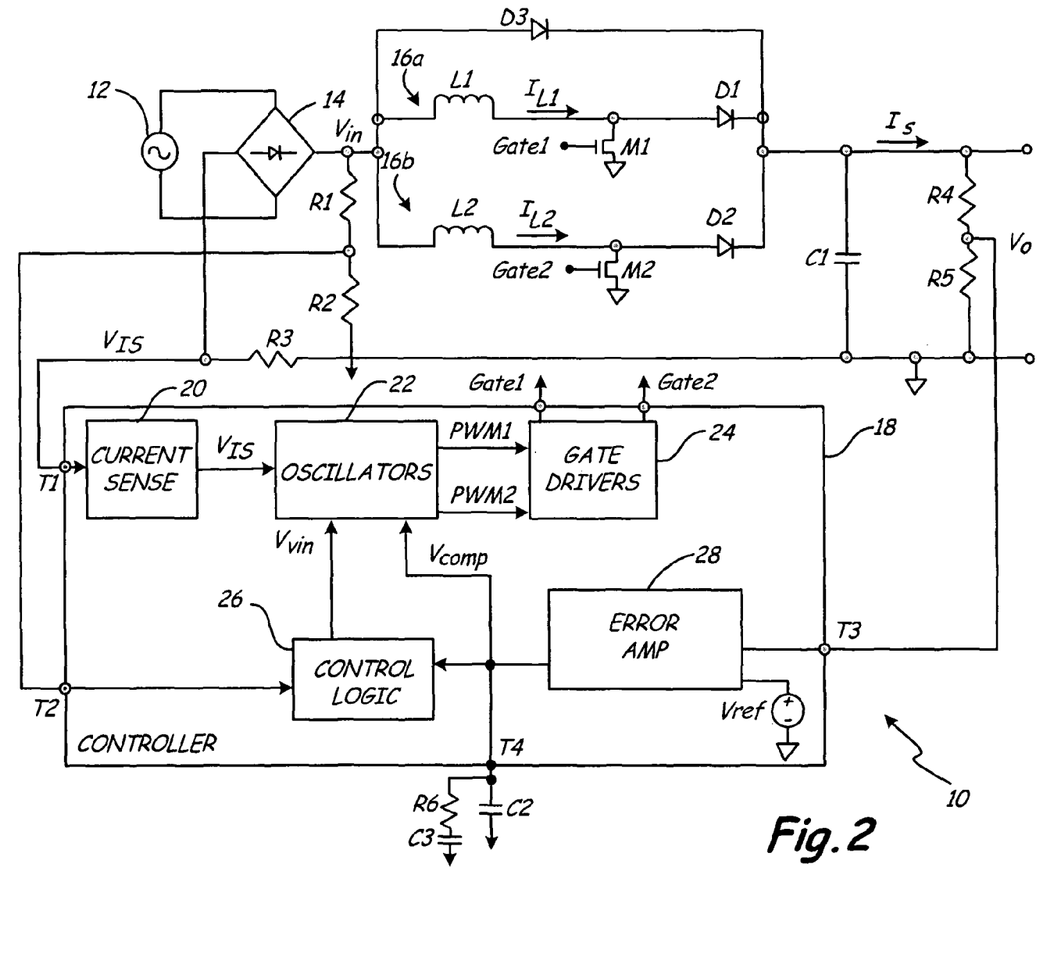
FIG. 2 is a circuit diagram of a two-phase interleaved power factor correction (PFC) circuit according to an embodiment of the present invention.

Various methods of controlling the switch are known in the art, such as continuous conduction mode (CCM) and discontinuous conduction mode (DCM) control for providing power factor correction. These control schemes are applicable to single-phase PFC converters as well as two-stage or interleaved PFC converters. For example, the DCM control scheme, a variant of which is shown in FIG. 1, monitors the input current $I_{L1}$ through an inductor (e.g., inductor L1 as shown in FIG. 2) and turns ON the respective transistor when the current through the inductor equals zero. As a result, the gate drive signal GATE1 is ON for a period of time beginning when the inductor current $I_{L1}$ reaches zero and OFF for a period of time that is dependent on the time required for the inductor current $I_{L1}$ to decrease back to zero. As shown in FIG. 1, the frequency of the gate signal varies over the half-cycle of the rectified input voltage.

Losses associated with a PFC converter are related to both the inductor current (i.e., conduction losses) and the switching frequency (i.e., switching losses). If the conduction losses dominate (e.g., high load current), then it is advantageous to operate an interleaved PFC converter in the interleaved or two-phase mode in which the load current is divided between each PFC sub-circuit. Because conduction losses are related to the square of the load current, dividing the current between two PFC sub-circuits halves the conduction losses. If the switching losses dominate (e.g., typically in response to a light load condition) then it is advantageous to disable one of the PFC sub-circuits to operate in a single-phase or saving energy mode (SEM).

However, the operating point at which it is more efficient to operate in the SEM mode versus the interleaved mode changes throughout each half-cycle of the AC input voltage, making it difficult to determine when to transition between each configuration. In addition, it is often preferable to use multiple variables to determine whether the switching losses are balanced with the conductions losses. The switching losses are related to the frequency of the switching, which in turn is related to both the magnitude of the inductor current $I_{L1}$ and the slope with which the inductor current decreases (which in turn is related to the difference between the input voltage and the output voltage). Likewise; the conduction losses vary with the inductor current.

The present invention provides a controller and method for determining transitions between an interleaved mode and a saving energy mode (SEM). The determination is based on an amplified error signal Vcomp, which is derived from the monitored output voltage Vo but also related to the monitored input voltage Vin and the inductor currents $I_{L1}$ and $I_{L2}$. The amplified error signal Vcomp is monitored and compared to threshold values to determine when to transition between the interleaved mode and the SEM mode. In addition, the threshold values themselves are modified in response to the monitored input voltage Vin to account for the effects of the input voltage Vin on the amplified error signal Vcomp. The resulting controller and method provides for improved efficiency associated with interleaved PFC converters.

FIG. 2 is a circuit diagram illustrating a power factor correction (PFC) converter 10 according to an embodiment of the present invention. PFC converter 10 is connected to receive alternating current (AC) power from AC power supply 12. PFC converter 10 includes rectifier circuit 14, first PFC sub-circuit 16a, which includes inductor L1, transistor M1, and diode D1, second PFC sub-circuit 16b, which includes inductor L2, transistor M2, and diode D2, capacitors C1, C2, and C3, resistors R1, R2, R3, R4, R5, and R6, and controller 18, which includes current sense circuit 20, oscillator circuit 22, gate drive circuit 24, control logic 26 and error amplifier circuit 28.

In the embodiment shown in FIG. 2, interleaved PFC converter 10 is comprised of two PFC sub-circuits 16a and 16b, connected in parallel with one another to convert alternating current (AC) input provided by AC source 12 and rectified by rectifier circuit 14 to the desired DC output voltage Vo. Transistors M1 and M2 are selectively turned ON and OFF to charge and discharge inductors L1 and L2, respectively. For example, when transistor M1 is ON, rectified input voltage $V_{in}$ provides charging power to inductor L1. When transistor M1 is OFF, energy stored in inductor L1 is discharged through diode D1 to output voltage $V_o$. Resistors R1 and R2 form a voltage divider for providing a voltage signal proportional to the input voltage $V_{in}$. Similarly, resistors R4 and R5 form a voltage divider for providing a voltage signal proportional to the output voltage Vo. Resistor R3 is connected to generate a voltage signal proportional to the inductor current Is (i.e., the sum of inductor currents $I_{L1}$ and $I_{L2}$).

Controller 18 includes input terminals T1, T2, T3, and T4 for monitoring the operation of PFC converter 10 and output terminals Gate1 and Gate2 for providing gate drive signals to transistors M1 and M2. Input terminal T1 receives a voltage signal $V_{IS}$ representative of the inductor current Is. Input terminal T2 receives a voltage signal representative of the monitored input voltage $V_{in}$ provided as an input to interleaved PFC converter 10 and input terminal T3 receives a voltage signal representative of the output voltage $V_o$ provided by PFC converter 10. The input terminal T4 provides an amplified error signal that reflects differences between the monitored output voltage Vo and a reference voltage Vref.

Current sense circuit 20 generates signal $V_{is}$ representing the inductor current Is based on the voltage signal provided to input terminal T1. Likewise, error amplifier circuit 28 generates an output based on differences between the signal representing the monitored output voltage $V_o$ provided at input terminal. T3 and the reference voltage $V_{ref}$. The output of error amplifier circuit 28 is modified by input terminal T4 and an associated filter network (comprised of resistor R6 and capacitors C2 and C3) to generate the amplified error signal $V_{comp}$ provided to oscillator circuit 22 and control logic 26.

A benefit of interleaved PFC converters, as opposed to single phase PFC converters, is the current provided by the interleaved PFC converter 10 is divided between each of the first and second parallel-connected PFC sub-circuits 16a and 16b. Dissipation losses associated with a PFC converter are related to the square of the current through the circuit. By dividing the current through two parallel connected PFC sub-circuits, the power provided by the interleaved PFC converter remains the same while the conduction losses are halved. However, each PFC sub-circuit has associated switching losses that depend on the frequency of operation and parasitic capacitances associated with transistors M1 and M2. At different operating points (e.g., small loads) the switching losses associated with operating a pair of PFC sub-circuits outweighs the benefits associated with dividing the load current between the PFC sub-circuits. At this point, it becomes more energy efficient to turn OFF one of the PFC sub-circuits (e.g., PFC sub-circuit 16b) and operate the PFC converter like a single-phase converter. This state is referred to as the saving energy mode (SEM).

However, the determination of when it becomes advantageous to operate in either the interleaved configuration or the SEM configuration varies at different operating points. The present invention makes the determination based on an amplified error signal Vcomp. As discussed above, the amplified error signal Vcomp is a function of the monitored output voltage Vo. The monitored output voltage Vo, measured using a voltage divider circuit that includes resistors R3 and R4, is provided to error amplifier circuit 28. In the embodiment shown in FIG. 2, error amplifier circuit 28 is a transconductance amplifier that compares the monitored output voltage Vo to a reference voltage Vref. The output generated by error amplifier circuit 28 is conditioned by the filter network comprising resistor R6 and capacitors C2 and C3 to generate the amplified error signal Vcomp, expressed by the following equation:

$$V\text{comp} = (V\text{ref} - Vo) * H(s) \qquad \text{Equation 1}$$

In Equation 1, Vcomp is the amplified error signal, Vref is the reference voltage, Vo is the monitored output voltage Vo and H(s) is the transfer function of the transconductance amplifier and associated filter network.

In addition, the monitored output voltage is related to the monitored input voltage Vin by the following equations:

$$Vo = \frac{Vin}{(1-D)} \qquad \text{Equation 2}$$

-continued $$Vo = \frac{2*I_s*L*(D^2 - 2D + 1)}{D*Ton*\eta}$$ Equation 3

With respect to Equation 2, the monitored output voltage Vo is shown to be related to the monitored input voltage Vin and the duty cycle D of the converter. With respect to Equation 3, the monitored output voltage is shown to be related to inductor current Is (i.e. the sum of inductor currents IL1 and IL2), the duty cycle D of the PFC converter 10 (or sub-circuit of PFC converter 10), the ON time of PFC converter 10 (or sub-circuit of PFC converter 10) and the efficiency η of the converter. Equations 1-3 provides the following relationship between the amplified error signal Vcomp and the monitored input voltage Vin and monitored inductor current IS.

$$Vcomp \propto \frac{1}{Vin}$$ Equation 4

$$Vcomp \propto I_s$$ Equation 5

The amplified error signal Vcomp, as illustrated by Equations 4 and 5, is inversely related to the monitored input voltage Vin and directly related to the inductor current $I_S$. Because the decision of whether to operate in the interleaved mode or the SEM mode is dependent on the conduction losses (defined by the inductor current) and the switching losses (related to the input voltage), the amplified error signal Vcomp is well-suited to determining the correct operating mode. However, the relationship between Vcomp and the input voltage Vin and inductor current $I_S$ varies at different operating points. Therefore, control logic 26 determines whether to operate in the interleaved mode or SEM mode based on the amplified error signal Vcomp provided by error amplifier circuit 28. In other embodiments, control logic 26 employs the monitored input voltage Vin to further determine whether to operate in the interleaved mode or SEM mode. Based on the determination, control logic 26 provides an output signal (labeled 'SEM') to oscillator 22 that dictates whether PFC converter 10 is operated in the interleaved mode or the SEM mode.

Based on the amplified error signal Vcomp, oscillator 22 generates pulse width modulated control signals PWM1 and PWM2 provided to gate driver circuit 24. In response to the SEM signal provided by control logic circuit 26 being 'high', indicating operation in the SEM mode, oscillator 22 only generates one PWM control signal such that one PFC sub-circuit is turned OFF or disabled.

Figure 3:
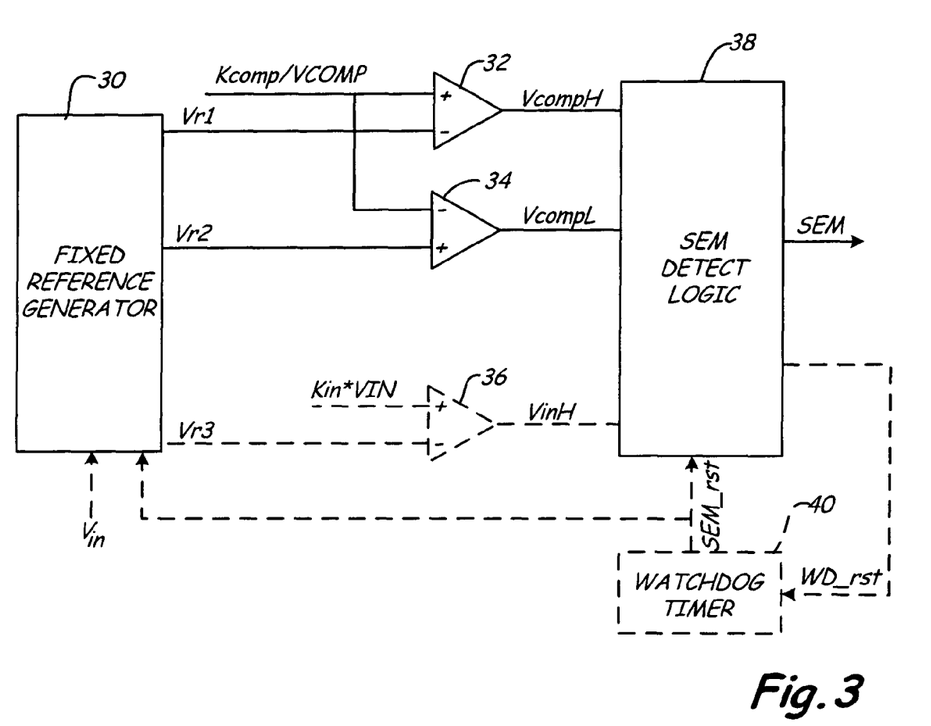
FIG. 3 is a logic diagram of a saving energy mode (SEM) controller for determining whether to transition between the interleaved mode and the SEM mode according to an embodiment of the present invention.

FIG. 3 is a logic diagram illustrating a constant threshold embodiment of SEM control circuit 26 (as shown in FIG. 2) for determining whether to transition between the interleaved mode and the SEM mode. In the embodiment shown in FIG. 3, control circuit 26 includes fixed reference generator 30, comparators 32, 34, and 36, SEM detect logic 38, and watchdog timer 40. Dashed lines are used to highlight those features included in select embodiments of the present invention.

Fixed reference generator 30 generates reference voltages Vr1, Vr2 and Vr3. In particular, reference voltages Vr1 and Vr2 provide threshold values for determining when to transition from the interleaved mode to the SEM mode and when to transition from the SEM mode to the interleaved mode, respectively. In other embodiments, a single threshold value may be used to make this determination. However, employing a pair of threshold values provides hysteresis to prevent rapid oscillations between the interleaved mode and SEM mode due to small variations in the value of Vcomp.

In one embodiment, reference voltage Vr3 is compared to the monitored input voltage Vin by comparator 36 in an effort to modify transitions between the interleaved mode and SEM mode made based on the monitored input voltage. This may include preventing a transition to the SEM mode or modifying the reference voltages Vr1 and Vr2 to modify the operating point at which a transition is made.

In the embodiment shown in FIG. 3, the value of Kcomp*Vcomp is compared to references voltages Vr1 and Vr2 by comparators 32 and 34, respectively, wherein Kcomp conditions the amplified error signal Vcomp to an appropriate level, although for the sake of simplicity we refer to this value as simply amplified error signal Vcomp. Comparator 32 generates a logic signal VcompH that is 'high' when the Vcomp signal is less than reference voltage Vr1 and 'low' when the Vcomp signal is greater than reference voltage Vr1. Conversely, comparator 34 generates a logic signal VcompL that is 'high' when the Vcomp signal is greater than reference voltage Vr2 and 'low' when the Vcomp signal is less than reference voltage Vr2. Comparator 36 compares the reference voltage Vr3 to a voltage proportional to the input voltage Vin (e.g., Kin*Vin) and generates a logic signal Vinh that is 'high' when the input voltage Kin*Vin is greater than the reference voltage Vr3 and 'low' when the input voltage Kin*Vin is less than the reference voltage Vr3. Once again, the value Kin conditions the monitored input voltage Vin to an appropriate level, though for the sake of simplicity we refer to the signal as simply the monitored input voltage Vin. In one embodiment, comparator 36 is a comparator with hysteresis that accounts for small variations or noise associated with the monitored in put voltage Vin.

SEM detect logic 38 determines when to transition between the interleaved mode and the SEM mode based on comparator outputs VcompH, VcompL and Vinh, and generates an output signal 'SEM' that is provided to oscillator 22 (as shown in FIG. 2). When the SEM signal is 'high', PFC converter 10 is operated in the SEM mode. When the SEM signal is 'low', PFC converter 10 is operated in the interleaved mode.

In response to the amplified error signal Vcomp decreasing below the first threshold Vr1, SEM detect logic 38 transitions PFC converter 10 from the interleaved mode to the SEM mode. In response to the amplified error signal Vcomp increasing above the second threshold value Vr2, SEM detect logic 38 transitions PFC converter 10 from the SEM mode to the interleaved mode.

In one embodiment, in addition to comparing the amplified error signal Vcomp to threshold values, the determination of the mode of operation is further defined by the value of the monitored input voltage Vin. As illustrated by equation 1, above, the value of Vcomp is inversely related to the monitored input voltage Vin. As the input voltage increases, the value of Vcomp decreases, making it difficult to determine whether the value of Vcomp is decreasing due to a smaller inductor current $I_S$ (in which case it is desirable to transition to the SEM mode) or whether the value of Vcomp is decreasing due to an increase in the input voltage Vin. To account for the effect the input voltage has on the value of Vcomp, the embodiment shown in FIG. 3 compares the input voltage Vin to a reference voltage Vr3. In particular, the determination of which mode to operate in is modified if the monitored input voltage Vin is greater than the reference voltage Vr3. In one embodiment described with respect to FIGS. 4A-4E below, if the monitored input voltage Vin is greater than the reference voltage Vr3, SEM detect logic circuit 38 is prevented from disabling second PFC sub-circuit 16b (i.e., PFC converter is operated in the interleaved mode despite the value of the amplified error signal). In another embodiment described with respect to FIGS. 5A-5E below, if the monitored input voltage Vin is greater than the reference voltage Vr3, the first threshold value Vr1 and the second threshold value Vr2 are decreased. When the monitored input voltage decreases below the third threshold value Vr3, SEM detect logic circuit 38 is once again allowed to selectively disable second PFC sub-circuit 16b in response to the amplified error signal Vcomp decreasing below the threshold value or the first and second threshold values are returned to their initial levels.

In the embodiment that further modifies transitions to the SEM mode based on the monitored input voltage Vin, watchdog timer circuit 40 may be provided to act as a filter to prevent transitions to the SEM mode in response to the monitored input voltage Vin temporarily decreasing below the threshold value. For example, the monitored input voltage Vin is a rectified signal that include peaks and valleys. Although the monitored input voltage Vin drops below the threshold value during the valleys, it should not result in transitions to the SEM mode. Watchdog timer circuit 40 is therefore used to filter out valleys in the monitored input voltage Vin. In particular, rather than immediately restore an initial condition (i.e., SEM logic circuit 38 is allowed to selectively disable the second PFC sub-circuit or the first and second threshold values are restored) in response to the monitored input voltage decreasing below the third threshold value, watchdog timer circuit 40 requires the monitored input voltage Vin to remain below the third threshold value for a period of time before the initial condition is restored. In this way, watchdog timer circuit 40 prevents short-term variations in the monitored input voltage Vin from disrupting the operation of PFC converter 10. For instance, if the input voltage Vin is greater than the defined threshold Vr3 and PFC converter 10 is operating in the interleaved mode as a result, then variations in the input voltage Vin causing the input voltage to decrease below the threshold value Vr3 for a short period of time should not result in PFC converter 10 transitioning from the interleaved mode to the SEM mode. In this embodiment, watchdog timer circuit 40 is initiated when the input voltage Vin decreases below threshold value Vr3. If watchdog timer 40 reaches a predetermined count before the input voltage Vin increases above threshold value Vr3, then watchdog timer causes SEM detect logic circuit 38 to place PFC converter 10 in the SEM mode (assuming that the Vcomp signal is below the threshold defined by Vr1). However, if the input voltage Vin increases above the threshold value Vr3 prior to watchdog timer circuit 40 reaching the predetermined count, then watchdog timer circuit 40 is reset by SEM detect logic circuit 38 (i.e., with reset signal WD_rst) and SEM detect logic circuit 38 maintains PFC converter 10 in the interleaved mode (despite the value of the amplified error signal Vcomp).

Figure 4A:
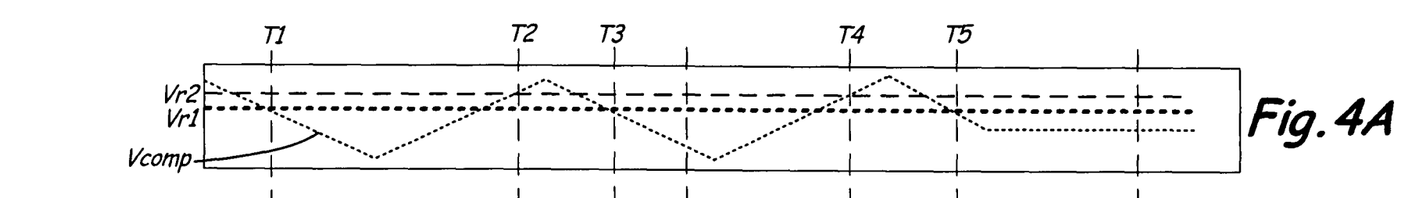
FIGS. 4A-4C are timing diagrams illustrating transitions between the interleaved mode and the SEM mode using a single threshold according to an embodiment of the present invention.
Figure 4B:
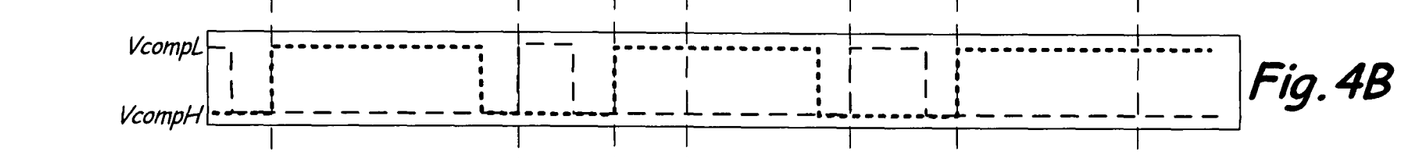
Figure 4C:
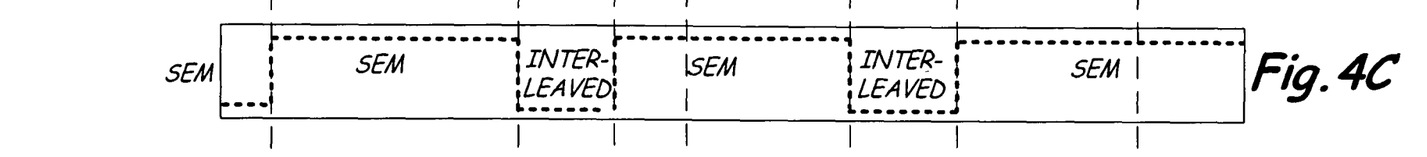

FIGS. 4A-4C are waveforms illustrating the inputs and outputs provided to SEM detect logic circuit 38 according to an embodiment of the present invention. FIG. 4A illustrates the comparison of the signal Vcomp to threshold values Vr1 and Vr2. FIG. 4B illustrates the outputs provided by comparator circuits 32 and 34 generated as a result of the comparison of Vcomp to threshold values Vr1 and Vr2, respectively. FIG. 4C illustrates the SEM output provided by SEM detect logic 38 that determines whether PFC converter 10 operates in SEM mode or interleaved mode. For the sake of simplicity in describing the relationship between Vcomp and selected mode of operation, the amplified error signal is expressed as simply Vcomp, rather than as the inversely related Kcomp/Vcomp signal provided to comparator circuits 32 and 34 as shown in FIG. 3.

At time T1, the amplified error signal Vcomp decreases below the first threshold value Vr1 as shown in FIG. 4A. As a result, the output VcompH of comparator circuit 32 goes 'high', as shown in FIG. 4B, and PFC converter 10 is operated in the SEM mode as indicated by the SEM output going 'high' as shown in FIG. 4C.

At time T2, the amplified error signal Vcomp increases above the second threshold value Vr2. The output VcompL of comparator circuit 34 goes 'high' and PFC converter 10 is transitioned from the SEM mode to the interleaved mode as shown in FIG. 4C. At time T3, the amplified error signal decreases below the first threshold value Vr1, resulting in PFC converter 10 being operated in the SEM mode once again.

At time T4, the amplified error signal Vcomp once again increases above the second threshold value Vr2, causing PFC converter 10 to transition from the SEM mode to the interleaved mode as shown in FIG. 4C. At time T5, the amplified error signal Vcomp decreases below the first threshold value Vr1, causing PFC converter 10 to transition from the SEM mode to the interleaved mode as shown in FIG. 4C. FIGS. 4A-4C therefore illustrate transitions an embodiment in which the monitored input voltage is either below the third threshold value or is not employed to affect the enabling and disabling of the second PFC sub-circuit to transition between the interleaved mode and the SEM mode.

Figure 5A:
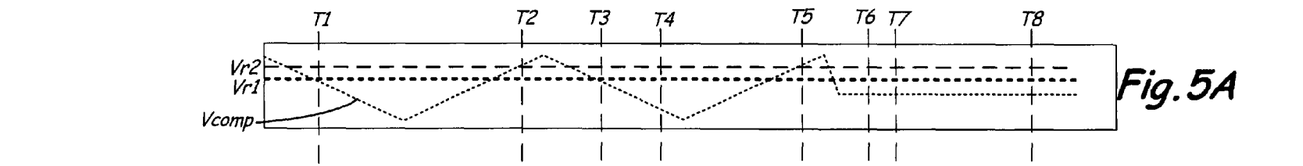
FIGS. 5A-5E are timing diagrams illustrating transitions between the interleaved mode and the SEM mode using a single threshold and watchdog timer according to an embodiment of the present invention.
Figure 5B:
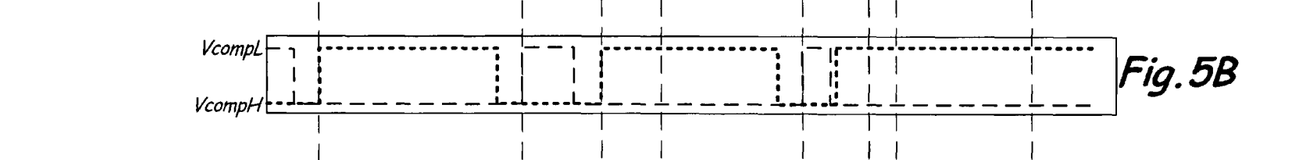
Figure 5C:
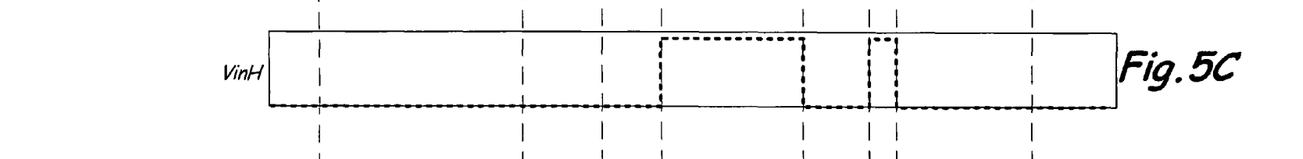
Figure 5D:
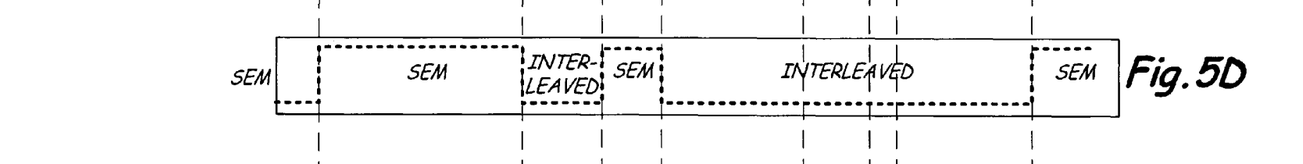

FIGS. 5A-5E are waveforms illustrating the inputs and outputs provided to SEM detect logic circuit 38 according to another embodiment of the present invention that employs inputs from comparator 30 and watchdog timer 34. FIG. 5A illustrates the comparison of the signal Vcomp to threshold values Vr1 and Vr2. FIG. 5B illustrates the outputs provided by comparator circuits 32 and 34 generated as a result of the comparison of Vcomp to threshold values Vr1 and Vr2, respectively. FIG. 5C illustrates the output VinH of comparator circuit 36 in response to the monitored input voltage Vin. FIG. 5D illustrates the SEM output provided by SEM detect logic 38 that determines whether PFC converter 10 operates in SEM mode or interleaved mode. FIG. 4E illustrates the internal count kept by watchdog timer circuit 40.

As in the embodiment illustrated with respect to FIGS. 4A-4C, when the monitored input voltage Vin remains below the third threshold value Vr3 (as indicated by the output VinH provided by comparator 30), PFC converter 10 operates in the SEM mode or interleaved mode based on comparisons of the amplified error signal Vcomp to the first and second threshold values Vr1 and Vr2. For example, at time T1, the amplified error signal Vcomp decreases below the first threshold value Vr1, resulting in PFC converter 10 being operated in the SEM mode. At time T2, the amplified error signal Vcomp increases above the second threshold value Vr2, resulting in PFC converter 10 transitioning from the SEM mode to the interleaved mode. At time T3, the amplified error signal Vcomp decreases below the first threshold value Vr1, resulting in PFC converter 10 being operated in the SEM mode once again.

In this embodiment, at time T4, the monitored input voltage Vin exceeds the third threshold value Vr3, as indicated by the output of VinH of comparator 36 (shown in FIG. 5C) being set 'high'. In response, PFC converter 10 is operated in the interleaved mode as indicated in FIG. 5D, this despite the amplified error signal Vcomp being less than the first threshold value. In this embodiment, if the monitored input voltage Vin is greater than the third threshold value Vr3 then PFC converter 10 is operated in the interleaved mode despite the value of amplified error signal Vcomp being below the first threshold value Vr1.

Figure 5E:
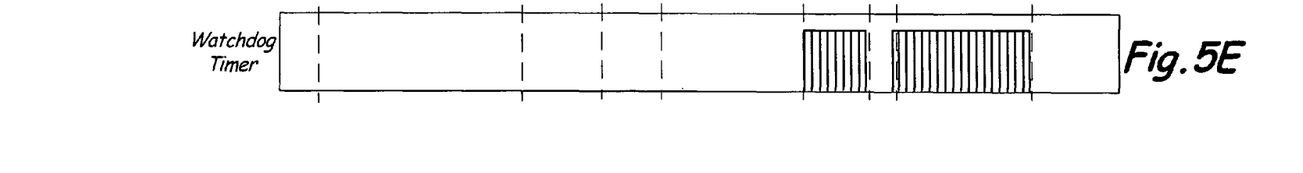

At time T5, the monitored input voltage Vin decreases below the third threshold value Vr3 such that the output VinH of comparator 36 is set 'low'. In response to the monitored input voltage Vin decreasing below the third threshold value Vr3, watchdog timer circuit 40 is initiated as shown in FIG. 5E. However, before the expiration of watchdog timer circuit 40, at time T6 the input voltage Vin increases above the third threshold voltage Vr3. In response, the watchdog timer is reset and no change is made to the mode of operation despite the amplified error signal Vcomp decreasing below the first threshold value Vr1.

At time T7, the monitored input voltage Vin again decreases below the third threshold value Vr3 and watchdog timer circuit 40 is once again initiated. At time T8, watchdog timer circuit 40 reaches a predetermined count (i.e., expires). In response, PFC converter 10 is operated in the SEM mode because the amplified error signal Vcomp is less than the first threshold value Vr1.

Figure 6A:
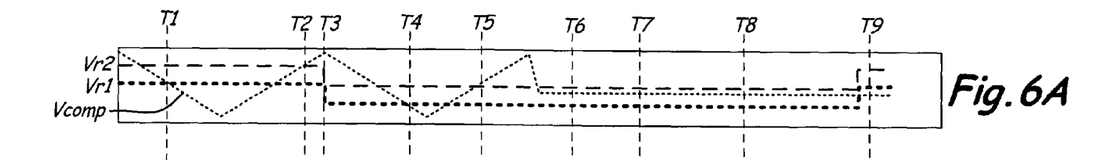
FIGS. 6A-6E are timing diagrams that illustrates transitions between the interleaved mode and the SEM mode employing variable thresholds according to an embodiment of the present invention.
Figure 6B:
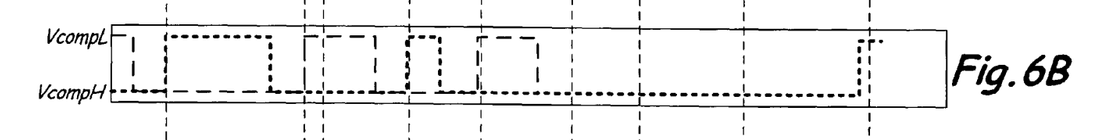
Figure 6C:
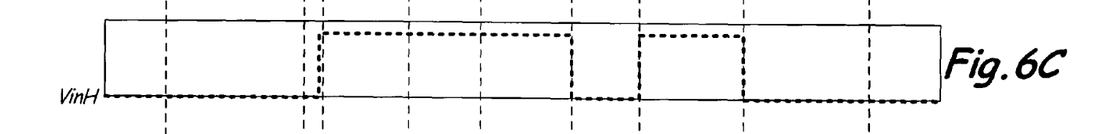
Figure 6D:
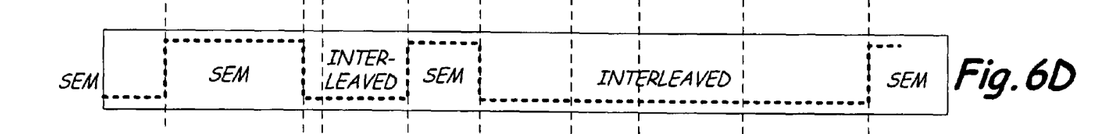
Figure 6E:
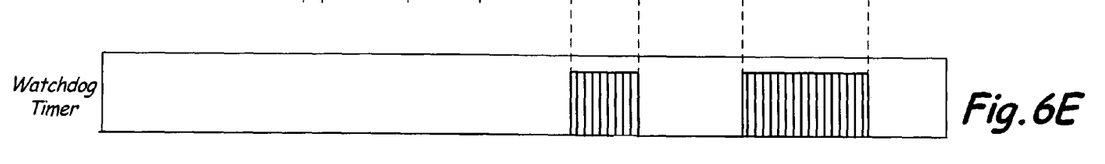

FIGS. 6A-6E are waveforms illustrating the inputs and outputs provided to SEM detect logic circuit 38 according to another embodiment of the present invention. FIG. 6A illustrates the comparison of the signal Vcomp to threshold values Vr1 and Vr2, which are selectively varied based on the value of the monitored input voltage Vin. FIG. 6B illustrates the outputs provided by comparator circuits 32 and 34 generated as a result of the comparison of Vcomp to threshold values Vr1 and Vr2, respectively. FIG. 6C illustrates the monitored input voltage Vin. FIG. 6D illustrates the SEM output provided by SEM detect logic 38 that determines whether PFC converter 10 operates in SEM mode or interleaved mode. FIG. 6E illustrates the operation of watchdog timer in determining whether the input voltage Vin has remained 'low' (i.e., below a threshold value) for a period of time such that the thresholds should be returned to their previous values.

In particular, FIGS. 6A-6E illustrate an embodiment in which the thresholds Vr1 and Vr2 are selectively modified in response to the monitored input voltage Vin. The value of Vcomp is related to both the input voltage Vin and the inductor current $I_S$. Modifying the thresholds Vr1 and Vr2 in response to the monitored input voltage Vin accounts for the effect of the input voltage Vin on the value of Vcomp.

FIG. 6A illustrates the value of Vcomp with respect to threshold values Vr1 and Vr2. Initially, threshold values Vr1 and Vr2 are set at the same values provided in FIG. 4A. At time T1, the value of Vcomp decreases below the threshold value Vr1, resulting in the comparator output VcompH being set 'high'. In response, SEM detect logic 38 causes the output SEM to be set 'high', such that PFC converter 10 is operated in the SEM mode. At time T2, the value of Vcomp increases above the threshold value Vr2, resulting in comparator output VcompL being set 'high'. In response, SEM detect logic 38 causes the output SEM to be set low, such that PFC converter 10 is operated in the interleaved mode.

At time T3, the monitored input voltage Vin exceeds the third threshold value Vr3 such that the output VinH of comparator circuit 36 is set 'high'. In response, the threshold values Vr1 and Vr2 are modified to account for the change in the input voltage, with both threshold values being decreased by some amount. At time T4, the value of Vcomp decreases below the redefined threshold value Vr1, resulting in the output VcompH of comparator 32 being set 'high'. In response, SEM detect logic circuit 38 causes the output SEM to be set 'high', such that PFC converter 10 is operated in the SEM mode. At time T5, the value of Vcomp increases above the redefined threshold value Vr2, resulting in comparator output VcompL being set 'high'. In response, SEM detect logic circuit 38 causes the output SEM to be set 'low', such that PFC converter 10 is operated in the interleaved mode.

At time T6, the input voltage Vin decreases below the third threshold value Vr3 such that the output VinH of comparator circuit 36 is set 'low'. In response, watchdog timer circuit 40 begins counting as illustrated in FIG. 5E. However, before watchdog timer 40 reaches a predetermined count (i.e., expires), at time T7 the input voltage Vin increases above the third threshold value Vr3. As a result, the threshold values Vr1 and Vr2 remain unchanged despite variations in the input voltage Vin, and watchdog timer circuit is reset. At time T8, the input voltage Vin once again decreases below the third threshold value Vr3, resulting in the watchdog timer being initiated. At time T9, watchdog timer 40 reaches the predetermined count (e.g., expires), generating a SEM reset signal provided to SEM detect logic circuit 38 that results in the first threshold Vr1 and second threshold Vr2 being modified to their original values. In this case, both threshold values are increased to their original values. At time T9, as a result of the first threshold value being redefined, the amplified error signal is now less than the first threshold value such that PFC converter 10 is transitioned to the SEM mode.

In the embodiment illustrated in FIGS. 6A-6E, the magnitude of voltage thresholds Vr1 and Vr2 are modified in response to the monitored input voltage crossing a threshold value. In other embodiments, the magnitude of the voltage thresholds Vr1 and Vr2 are modified at various set-points according to the value of the monitored input voltage Vin, or continuously varied in response to the monitored input voltage Vin.

In this way, the present invention provides a controller and method of determining the most efficient time to transition between the interleaved mode of operation and the SEM mode of operation based on the amplified error signal Vcomp and the monitored input voltage Vin.

While the invention has been described with reference to an exemplary embodiment(s), it will be understood by those skilled in the art that various changes may be made and equivalents may be substituted for elements thereof without departing from the scope of the invention. In particular, portions of the invention have been described with respect to analog circuits, but in other embodiments digital circuits and/or processors employing a combination of hardware and software may be employed to implement the described functions. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of controlling an interleaved power factor correction (PFC) converter having a first PFC sub-circuit and a second PFC sub-circuit, the method comprising:
   generating an amplified error signal based on a monitored output voltage of the interleaved PFC converter;
   disabling the second PFC sub-circuit in response to the amplified error signal being less than a first threshold value;
   enabling the second PFC sub-circuit in response to the amplified error signal exceeding a second threshold value; and
   modifying the enabling and disabling of the second PFC sub-circuit by preventing the disabling of the second PFC sub-circuit in response to a monitored input voltage exceeding a third threshold value.

2. The method of claim 1, wherein the first threshold value is less than the second threshold value.

3. The method of claim 1, further including:
initiating a timer circuit in response to the monitored input voltage decreasing below the third threshold value;
resetting the timer circuit in response to the monitored input voltage increasing above the third threshold value before the timer has expired; and
returning the enabling and disabling of the second PFC sub-circuit to an initial state in response to the timer expiring.

4. An interleaved power factor correction (PFC) converter comprising:
a first power factor correction (PFC) sub-circuit;
a second PFC sub-circuit connected in parallel with the first PFC sub-circuit; and
a controller connected to monitor an output voltage of the PFC converter and an input voltage of the PFC converter, the controller generating an amplified error signal based on a monitored output voltage, the controller comparing the amplified error signal to a first threshold value and compares the input voltage to an input voltage threshold value to determine whether to enable or disable the second PFC sub-circuit, wherein the control selectively disables the second PFC sub-circuit when the amplified error signal decreases below the first threshold value and modifies the enabling and disabling of the second PFC sub-circuit based on the comparison of the monitored input voltage to the input voltage threshold value.

5. The controller of claim 4, wherein the controller selectively enables the second PFC sub-circuit when the amplified error signal exceeds a second threshold value.

6. The controller of claim 4, wherein the controller prevents the disabling of the second PFC sub-circuit in response to the monitored input voltage exceeding the input voltage threshold value.

7. The controller of claim 4, wherein the controller decreases the first threshold value and the second threshold value in response to the monitored input voltage exceeding the input voltage threshold value.

8. The controller of claim 4, wherein the controller further includes:
a timer circuit that is activated in response to the monitored input voltage decreasing below the input voltage threshold value, wherein if the timer circuit expires before the monitored input voltage exceeds the input voltage threshold value then the enabling and disabling of the second PFC sub-circuit is returned to an initial state.

9. A controller for an interleaved power factor correction (PFC) converter having a first PFC sub-circuit and a second PFC sub-circuit interleaved with the first PFC sub-circuit, the controller comprising:
an error amplifier circuit for generating an amplified output based on a difference between a monitored output voltage of the PFC converter and a reference voltage;
a filter circuit for generating an amplified error signal based on the amplified output;
a first comparator circuit for comparing the amplified error signal to a first threshold value;
a second comparator circuit for comparing a monitored input voltage to an input voltage threshold value; and
a control circuit for selectively enabling or disabling the second PFC sub-circuit based on outputs provided by the first comparator circuit and the second comparator circuit, wherein the control circuit prevents disabling of the second PFC sub-circuit in response to the monitored input voltage exceeding the voltage input threshold value.

10. The controller of claim 9, wherein the control circuit disables the second PFC sub-circuit in response to the amplified error signal decreasing below the first threshold value.

11. The controller of claim 9, wherein the control circuit enables the second PFC sub-circuit in response to the amplified error signal exceeding the first threshold value.

12. The controller of claim 9, further including:
a timer circuit connected to provide a reset output in response to the monitored input voltage decreasing below the input voltage threshold value for a fixed period of time, wherein in response to the reset output the control circuit is allowed to disable the second PFC sub-circuit in response to the amplified error signal decreasing below the first threshold value.

13. A method of controlling an interleaved power factor correction (PFC) converter having a first PFC sub-circuit and a second PFC sub-circuit, the method comprising:
generating an amplified error signal based on a monitored output voltage of the interleaved PFC converter;
disabling the second PFC sub-circuit in response to the amplified error signal being less than a first threshold value;
enabling the second PFC sub-circuit in response to the amplified error signal exceeding a second threshold value; and
modifying the enabling and disabling of the second PFC sub-circuit by decreasing the first threshold value and the second threshold value in response to a monitored input voltage exceeding a third threshold value.

14. The method of claim 13, further including:
initiating a timer circuit in response to the monitored input voltage decreasing below the third threshold value;
resetting the timer circuit in response to the monitored input voltage increasing above the third threshold value before the timer has expired; and
returning the enabling and disabling of the second PFC sub-circuit to an initial state in response to the timer expiring.

15. A controller for an interleaved power factor correction (PFC) converter having a first PFC sub-circuit and a second PFC sub-circuit interleaved with the first PFC sub-circuit, the controller comprising:
an error amplifier circuit for generating an amplified output based on a difference between a monitored output voltage of the PFC converter and a reference voltage;
a filter circuit for generating an amplified error signal based on the amplified output;
a first comparator circuit for comparing the amplified error signal to a first threshold value;
a second comparator circuit for comparing a monitored input voltage to an input voltage threshold value; and
a control circuit for selectively enabling or disabling the second PFC sub-circuit based on outputs provided by the first comparator circuit and the second comparator circuit, wherein the control circuit decreases the first threshold value in response to the monitored input voltage exceeding the input voltage threshold value.

16. The controller of claim 15, wherein the control circuit returns the first threshold value to an initial state in response to the monitored input voltage decreasing below the input voltage threshold value.

17. The controller of claim 15, further including:
a timer circuit connected to provide a reset output in response to the monitored input voltage decreasing below the input voltage threshold value for a fixed period of time, wherein in response to the reset output the control circuit is allowed to disable the second PFC sub-circuit in response to the amplified error signal decreasing below the first threshold value.

* * * * *